March 31, 1953   L. E. BALDWIN ET AL   2,633,102
IRREVERSIBLE HYDRAULIC PRESSURE POWER ACTUATOR
Filed Dec. 18, 1950   3 Sheets-Sheet 1
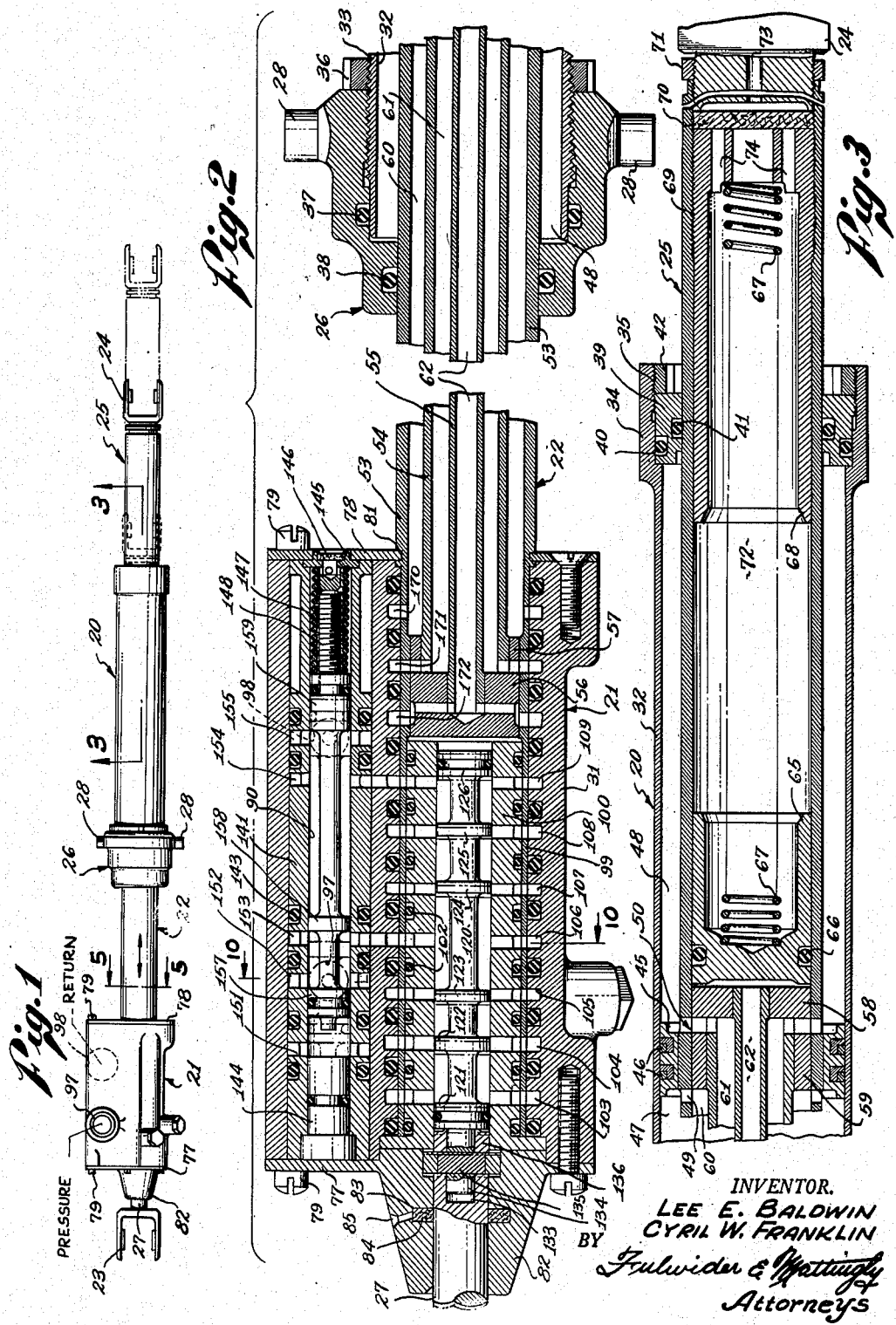
INVENTOR.
LEE E. BALDWIN
CYRIL W. FRANKLIN
BY Fulwider & Mattingly
Attorneys

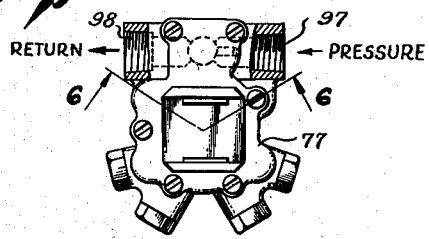
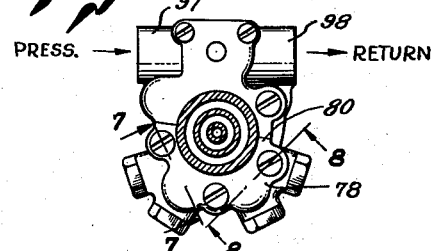
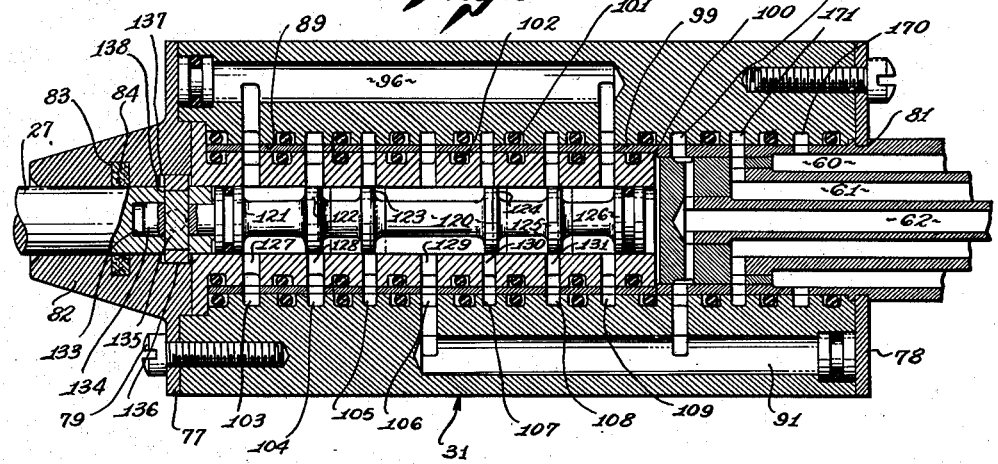

March 31, 1953 L. E. BALDWIN ET AL 2,633,102
IRREVERSIBLE HYDRAULIC PRESSURE POWER ACTUATOR
Filed Dec. 18, 1950 3 Sheets-Sheet 3
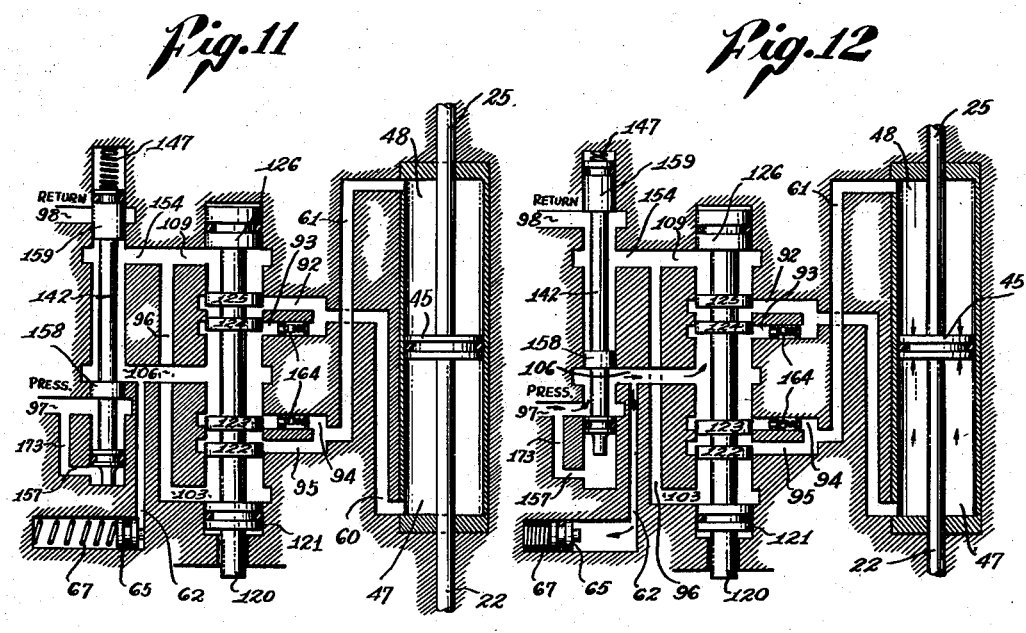
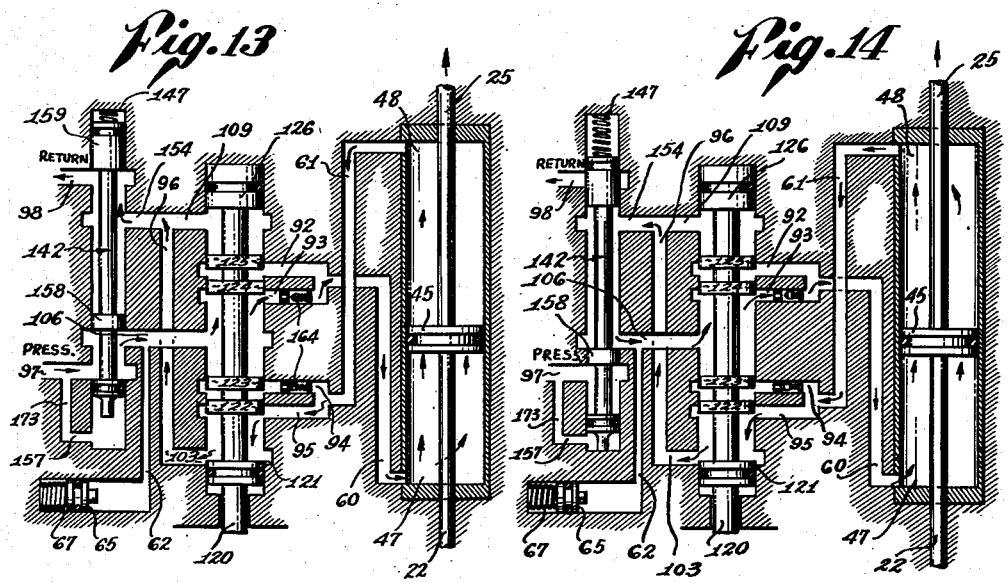
INVENTORS
LEE E. BALDWIN
BY CYRIL W. FRANKLIN
Attorneys Patented Mar. 31, 1953

2,633,102

UNITED STATES PATENT OFFICE 2,633,102

IRREVERSIBLE HYDRAULIC PRESSURE POWER ACTUATOR

Lee E. Baldwin, Los Angeles, and Cyril W. Franklin, Glendale, Calif., assignors to Weston Hydraulics, Limited, North Hollywood, Calif., a corporation of California Application December 18, 1950, Serial No. 201,358

13 Claims. (Cl. 121—40)

The present invention relates generally to hydraulic pressure powered motor units or actuators, and control valves therefor, and more particularly, to an assembly of such units especially adapted for use in moving the control surfaces and other movable elements in airplanes, helicopters, and other aircraft. While the particular actuator system shown herein as embodying the invention is designed for use in aircraft, it will be realized that the invention is not limited to use in such designs, but will provide advantages in any system employing hydraulic pressure powered actuators.

As larger and larger aircraft have been developed, and as the number of control surfaces in any single aircraft has been multiplied, as for example, in helicopters, the problem of control has become increasingly complex. In relatively large aircraft where the control surfaces are large, considerable effort must be exerted on such surfaces in order to change their position in the slipstream and maneuver the aircraft. To provide power for such operations so that the pilot will be able to fly the aircraft without the continuous exertion of muscular effort, it has become common practice to include in aircraft control systems, a supplementary hydraulic power system which provides either all or a part of the force necessary to move the control surfaces.

The supplementary power means just described usually take the form of a fluid pressure operated motor, e. g., a cylinder and piston, which motor is mechanically connected to the control surface to be moved, and the delivery of fluid pressure to the motor is under the control of the pilot. In some cases, the force exerted by the fluid motor is added to that exerted by the pilot which systems are generally referred to as "booster" systems. In other installations, all of the force necessary to move the control surface or other movable part is delivered by the fluid motor, the effort of the pilot being confined to moving control elements such as valves, whereby to control the operation of the fluid motor. As will become apparent hereinafter, the present invention is applicable to both of the hydraulic power systems just described.

Also, the invention may be used in connection either with systems in which the pilot may feel the reactive forces on the control surfaces exerted back through the actuating system, or in so called "no feel" systems which are irreversible. The irreversible, "no feel" system is the presently preferred embodiment of the invention.

One of the problems encountered in the use of hydraulic supplementary power systems of the class just described is the fact that in the event of a pressure failure, all of the work of holding the control surfaces in operative position must be performed by the pilot. Furthermore, in the event of a continuing unbalance of forces on a given control surface, such as may occur due to damage to the control surfaces themselves or to the trim controls, the pilot must continually oppose a relatively great reaction force exerted by the control surface, in order to keep the aircraft on a steady course.

Another problem often encountered in conventional supplementary hydraulic power systems is that occasioned by the presence of air bubbles in hydraulic pressure lines, and by distortion of such pressure lines themselves. Either presence of such air bubbles or the distortion of the lines introduces, in effect, a resilient link between control valves controlling the delivery of hydraulic fluid and the motor itself.

It is also highly desirable in aircraft to eliminate the weight of hydraulic lines and the attendant expense of installation and maintenance.

Yet another problem often encountered in systems of the class described is that arising in connection with follow-up systems when the action of the motor is not immediately and directly responsive to the operation of the controls. Thus, when the pilot is, for example, moving the control stick in a given direction and desires to reverse this direction, the hydraulic motor unit should immediately reverse its direction, i. e., there should be no "dead spot" in the control movements. Such dead spots not only make the response of the entire system sluggish, but permit undesirable and dangerous vibrations of the control system to occur.

Still another problem often encountered in conventional hydraulic systems of the class described arises when relatively long fluid passages are interposed between the control valves and the fluid motor. In such cases, particularly where the flow rates are quite high, as they usually are in aircraft control systems, the fluid moving in the passages develops considerable kinetic energy which is converted into false pressure heads which result in erratic behavior of the pressure motor at the beginning and the end of pressure strokes.

Bearing in mind the foregoing difficulties encountered in conventional designs, it is a major object of the present invention to provide in a hydraulic pressure actuator system irreversible locking means such that the actuated element cannot be forced to move in a direction opposite to that in which it is desired to move it, even when the reactive or resistive force greatly exceeds that exerted by the pilot, or even that exerted by the pilot and supplementary power system.

Another object of the invention is to provide a system of the class described in which the follow-up is extremely close and accurate, thus resulting in positive and accurate positioning of the element actuated.

Still another object of the present invention is to substantially reduce the weight of the supplementary power equipment as compared to the weight of conventional supplementary equipment of the class described.

Yet another object of the invention is to provide a unitary structure which avoids the necessity of providing and installing miscellaneous fittings, fuses, valving units, and other costly items of equipment.

Still another object of the invention is to provide a system of the class described in which the movable elements can be moved, if desired, without supplemental power, and in which the forces required to move the movable element during such times as the hydraulic pressure may be "off" are relatively small.

A further object of the invention is to reduce the "dead spot" in the follow-up system to a minimum whereby to eliminate undesirable and harmful vibration.

An additional object of the invention is to provide a system having hydraulic pressure lines of materially decreased length whereby to increase hydraulic stability and reduce the effect of compression and decompression of air bubbles and cavitation in the fluid system, whereby to avoid the effects of deflection of the pressure lines, and whereby to avoid the undesirable effects of kinetic pressure heads of the type above discussed.

The foregoing and additional objects and advantages of the invention will be apparent from the following detailed description of one embodiment thereof, such consideration being given also to the attached drawings, in which:

Figure 1 is an elevational view of a hydraulic actuator for aircraft control surfaces, and a control unit therefor;

Figure 2 is an enlarged elevational, axial section of the left-end portion of the device shown in Figure 1, such section being taken in the plane of Figure 1;

Figure 3 is an enlarged elevational section taken on the line 3—3 in Figure 1;

Figure 4 is an elevational view of the device shown in Figure 1 as seen from the left end, portions being sectioned to disclose the internal construction;

Figure 5 is an elevational section taken on the line 5—5 in Figure 1;

Figure 6 is a folded section taken on the line 6—6 in Figure 4;

Figure 7 is a fragmentary section taken on the line 7—7 in Figure 5;

Figure 8 is a fragmentary section taken on the line 8—8 in Figure 5;

Figure 9 is a perspective view of a check valve member forming a part of the construction of Figure 1;

Figure 10 is a transverse elevational section taken on the line 10—10 in Figure 2; and Figures 11 through 14 are schematic diagrams showing the arrangement of fluid passages in the device illustrated in Figure 1, and showing said device in various successive operational positions.

The device illustrated in the drawings as disclosing a preferred embodiment of the present invention, is a unitary self-contained actuator for aircraft controls, such actuator being of the type in which, during normal operation, substantially all of the power required to move the control is supplied by the supplementary hydraulic system, the effort of the pilot being only that required to move a control valve. The system is so constructed and arranged, however, that in the event of a failure of hydraulic pressure, the movements and effort exerted by the pilot will be transmitted directly through the unit to the control surface being moved. Such "taking over" of the control operations by the pilot in the event of hydraulic pressure failure are fully automatic and require no special manipulation or other operation by the pilot.

The actuator shown in Figure 1 is intended to be included in a conventional thrust-tension control rod of the type in which reciprocal linear movements of the rod effect the desired movement of the movable control surface. Such control linkage being well known in the art, no detailed description thereof is necessary herein.

Referring to Figure 1, it will be seen that the actuator comprises a double acting power actuating cylinder assembly 20, a control assembly 21, and a reciprocable connecting rod 22, connecting the control assembly and cylinder. At the left-hand end of the control assembly 21 is a short projecting rod 27, carrying a conventional fork or clevis 23 of the usual design adapted for connection to the manually moved control elements, and at the right-hand end of the power actuating cylinder 20 is a second fork 24 of similar design to that of the fork 23, the fork 24 being adapted for connection to the element to be moved.

As will be hereinafter described in more detail, a thrust rod 25 extends from the right-hand end of the cylinder 20, carries the fork 24, and is, in effect, an extension of the connecting rod 22. A body 31 of the control assembly 21 is immovably secured to the left-hand end of the connecting rod 22, and the control fork 23 is in turn connected to the body 31 with a very small amount of lost motion between said elements, so that reciprocal axial movement of the fork 23 results in corresponding movement of the power fork 24. Thus, the device is adapted to "follow-up" that is, as the power fork 24 is moved by hydraulic power, the control fork "follows" or moves with it.

The power actuating cylinder 20 is closed at its left-hand end by a pressure head 26 having formed therein a pair of diametrically opposed trunnions 28. The trunnions 28 are received in conventional fixed trunnion bearings (not shown) whereby to take the reactive thrust of the power actuating cylinder 20 during normal "power on" operation, as will hereinafter be described.

The parts making up the power actuating cylinder 20 are best seen in Figures 2 and 3. Here it will be noted that the power actuating cylinder comprises an outer tube 32 having external threads 33 on the left-hand end thereof, and an expanded or shoulder portion 34 on the right-hand end. The shouldered portion 34 is internally threaded, as indicated at 35. The left-hand end of the cylinder tube 32 is threaded into the head 26, and hermetically sealed therein by a conventional O-ring 37 received in an internal groove in the head 36. A second O-ring 38 in the head 26 surrounds the connecting rod 22 to slidably seal the same in conventional manner.

The right-hand end of the cylinder tube 32 is closed by an internal plug 39 received in the threads 35 and sealed by an O-ring 40 positioned between the plug 39 and the interior of the tube 32. A second O-ring 41, at the right-hand end of the tube 32 and positioned in a groove in the plug 39, slidably seals off the thrust rod 25. The plug 39 is locked in place by an internally splined spanner nut 42 received in the threads 35.

The interior of the power cylinder tube 32 is highly finished, as by honing, and has received therein a slidable piston 45 provided with piston rings 46 to seal the same against the interior surface of the tube 32. The piston 45 is immovably and hermetically secured to the connecting rod thrust rod 22—25 intermediate the juncture thereof, whereby to form a cavity 47 to the left of the piston 45, and intermediate the connecting rod 22 and the tube 32, and a second cavity 48 to the right of the piston 45 intermediate the thrust rod 25 and the tube 32. Fluid ports 49, through the outer wall of the connecting rod 22, and 50, through the outer wall of the thrust rod 25, serve to deliver fluid into the cavities 47 and 48, respectively, as will hereinafter be described. Fluid may also pass out of the cavities 47 and 48, through the ports 49 and 50, respectively.

The connecting rod 22 is formed of three integrally interconnected concentric tubes 53, 54 and 55, secured together at their left-hand ends by an inner annular spacer 56 and an outer annular spacer 57, and at their right-hand ends by an inner spacer 58 and an outer annular spacer 59. The tubes 53, 54 and 55 are secured to the spacers 56, 57, 58 and 59 by copper brazing or similar means, whereby to form an integral hermetically sealed unit having an outer annular passageway 60 between the outer tube 53 and the intermediate tube 54, an intermediate passageway 61 between the tubes 54 and 55, and an inner passageway 62 within the innermost concentric tube 55. The passageways 60, 61 and 62 serve as the sole means of fluid communication between the control assembly 21 and the actuating cylinder 20.

Slidably received within the thrust rod 25 and to the right of the piston 45 is a hydraulic accumulator or bungee comprising a slidable piston 65 having an external O-ring seal 66, a compression spring 67, and a spring anchor 68 secured in the right-hand end of the thrust rod 25 by means of internal threads 69. The spring anchor 68 is locked in place by the power fork 24 which is threaded to the threads 69, and which in turn is held in place by an external lock nut 71. A filter 70 is interposed between the fork 24 and the spring anchor 68, the purpose of the filter being to remove dirt from air which may be drawn into the bungee air cavity 72 through an orifice 73 in the fork 24, and spanner holes 74 in the spring anchor 68.

Thus far it will be seen that the actuator assembly 20 is in essence a double acting fluid motor and can be operated in the usual manner by connecting a four-way valve between the fluid ports 49 and 50, and connecting the inlet and return ports of such a four-way valve to a source of fluid under pressure and to a fluid return. The control assembly 21, about to be described, includes such a four-way valve but is further modified to prevent counterflow of fluid back into the pressure source in the event the reactive force of the object being moved should overcome the force exerted by the motor. Further, it will be seen, the control assembly includes a pressure operated bypass valve which preserves the irreversibility feature even when the fluid pressure fails and also serves to permit volume compensating flow from one side of the piston 45 to the other so as to permit free manual operation of the device in the event of pressure failure.

Turning now to a discussion of the construction of the control assembly 21, it will be seen that the body 31 is closed at its left-hand end by a plate 77, and its right-hand end by a plate 78, the plates 77 and 78 being hermetically secured to the ends of the body 31 by bolts 79 threaded into the latter. The right-hand end plate 78 is diametrically split, as indicated by the reference character 80 in Figure 5, so that the plate 78 is adapted to embrace the connecting rod 22 and enter a peripheral groove 81 therein, whereby to immovably secure the control assembly 21 to the connecting rod 22.

The left-hand end plate 77 is provided with an extending boss 82 having an internal packing groove 83 therein, with packing 84 in said groove, and a lubricating hole 85 through the boss 82 by which oil or other lubricant may be supplied to the packing 84, to lubricate the rod 27 which is slidable in the boss 82, as will hereinafter be described.

The control assembly body 31 is formed with eight longitudinal bores, as can be seen best in Figure 10. These bores comprise a main bore 89 carrying the main control valve, an offset longitudinal bore 90 carrying a bypass valve, and six radially offset passageways 91, 92, 93, 94, 95, and 96, each of which extends for a part only of the full length of the body 31.

The body 31 is also provided with lateral fluid connections 97 and 98, which are internally threaded to receive conventional tube fittings, 97 being the inlet or pressure connection, and 98 being the outlet or return connection.

An extension 99 of the outer tube 53 of the connecting rod 22 extends throughout the main bore 89, and contains within it a flanged liner sleeve 100. The extension 99 is provided with a number of O-ring seals surrounding the same to seal it off against the body 31, and a number of internal O-rings 102 to seal it off against the sleeve 100, the latter being held in place by the flange on the left-end thereof which is clamped under the left-hand end plate 77.

A number of radial passageways communicate the internal bore of the sleeve 100 with passageways in the body 31. Such radial passageways each comprise an undercut groove in the main bore 89, a row of peripherally arranged holes in the tube extension 99 underlying such groove, an external groove in the liner sleeve 100 underlying the last-named peripherally arranged holes, and a plurality of peripherally arranged holes in the bottom of such groove in the liner.

For convenience in numbering the drawings, each of the composite radial passageways just described will be identified by a single reference character, there being in all seven passageways identified in Figure 6 by the reference characters 103 to 109, inclusive, reading from left to right.

The interior of the sleeve 100 is highly finished, as by honing and/or lapping, and has slidably received therein a valve spool 120. The spool 120 is formed with a number of flanges, the periphery of each of which is in fluid-tight sliding contact with the interior of the bore through the liner 100. The spool flanges are identified by the reference characters 121 through 126, and as can be seen in Figures 2 and 6, provide between themselves a plurality of annular recesses 127 through 131. The permissible axial movement of the spool 120 within the bore of the liner 100 is such as to selectively intercommunicate various pairs of the radial passageways 103 through 109.

The spool 120 is formed with a stub shaft 134 projecting from the left-hand end thereof and received in a bore 133 in the right-hand end of the shaft 27. The spool 120 is connected for axial movement with the shaft 27 by means of a cross pin 135 extending through the shaft 27 and the stub 134. The shaft 27 is also connected with the slight amount of lost motion to the left-hand end plate 77 by means of a split ring 136 positioned in complemental grooves 137 and 138 formed in the end plate 77 and the rod 27, respectively. The groove 137, being somewhat wider than the split ring 136, a slight amount of lost motion as between the rod 27 and the control assembly 21 is permitted. Such lost motion, it will be realized, is that which effects and limits the movement of the spool 120 within the liner 100.

In the body 31, in the offset bore 90 thereof, is positioned a fluid actuated bypass valve comprising a liner 141 having slidably mounted therein a movable spool 142, similar to the spool 120. External O-rings 143, positioned in grooves in the liner 141, seal the same against the body 31.

The bore within the liner 141 is closed at its left-hand end by a sealing plug 144, and at its right-hand end by a similar plug 145. Plugs 144 and 145 are retained in place by the end plates 77 and 78, as can be seen in Figure 2.

Within the right-hand end plug 145 is a filter 146 of foraminous material, such as sintered metal, or the like, the purpose of which is to remove dirt from air that is drawn into the bore of the liner 141 by movement of the spool 142, as will hereinafter be described. A spring 147, positioned under the right-hand end plug 145 and anchored against the spool 142, serves to urge the same toward the left. An extension 148 on the right-hand end of the spool 142 serves several purposes, to wit, to hold the spool 142 during the finishing operation thereof, to center the spring 147, and to form a stop against the plug 145 to limit the rightward movement of the spool 142.

The liner 141 has a number of radial passageways formed therein similarly to the liner 100, the radial passageways in the liner 141 being identified by the reference characters 151 through 155.

The valve spool 142 is formed with three flanges 157, 158 and 159, thus to form annular recesses similar in form and function to the recesses surrounding the main valve spool 120.

As thus far described, it will be seen that the body 31 has five fluid connections thereto, to wit, the pressure connection 97, the return connection 98, and the three concentric passageways in the connecting rod 22, identified by the reference characters 60, 61, and 62. Movement of the two valve spools 120 and 142 serves to interconnect and/or block various of the five just-mentioned fluid passageways in various combinations, as will hereinafter be described. In order to effect such intercommunication, certain other internal passageways in the body 31 are necessary as follows.

Intercommunication of any one of the radial passageways leading from the main bore 89 with any of the offset partial length passageways 91 through 96 is effected by a so-called "kidney cut," the shape and disposition of which can be seen in Figure 10, and is identified by the reference character 161. By means of such kidney cuts, various of the radial passageways 103 through 109, and 151 through 155 are intercommunicated through one or another of the partial length longitudinal passageways 91 through 96.

Each of the partial length bores 91 through 96 is blind at one end and closed at the other end by a plug and O-ring 162—163, as shown in Figure 7. Certain of the passageways, e. g., 94 in Figure 7, are provided with check valves comprising a valve member 164 having lateral centering bosses 165 thereon, a conical forward surface 166, and a compression spring 167 positioned and adapted to urge the surface 166 against a seat 168 formed in the passageway 94.

In addition to the aforementioned radial passageways 103 through 109 which intercommunicate the interior of the valve liner 100 with various passageways in the body 31, similar radial passageways 170, 171 and 172 serve to communicate the coaxial passageways 60 through 62, respectively, with passages in the body 31.

Summing up the effective intercommunication of the various passageways just described, the result is as follows. The pressure connection 97 is communicated with radial bypass passageways 151 and 152 (the former by means of a small diagonal passage 173—see Figure 10). The radial passage 153 adjacent the bypass spool 142 is communicated by a kidney cut with the central radial passage 106 adjacent the main spool valve 120. The radial passage 154 adjacent the bypass valve is communicated with the radial passage 109 adjacent the main spool valve. The radial passage 155, adjacent the bypass valve, is connected to the return connection 98. The concentric passageways within the connecting rod 22, to wit, 60, 61 and 62, are connected to the radial passageways 170, 171 and 172, as has been described. Radial passageways 172 and 106 are intercommunicated by the partial length bore 91. Radial passageways 103 and 109 are intercommunicated by the partial length passageway 96. Radial passageway 171 is also intercommunicated with radial passageway 104 by the partial length passage 95. Radial passageway 171 is also communicated with radial passageway 105 through partial length passageway 94, a check valve 164 being interposed as shown in Figure 7. Similarly, as shown in Figure 8, radial passageway 170 is intercommunicated with radial passageways 108 and 107, through partial length passageways 92 and 93, respectively, the latter having a check valve 164 therein.

The system of fluid passageways produced by the foregoing structure is illustrated schematically in Figures 11 through 14. For purposes of simplicity in the description, only a single reference character will be used to describe each branch passageway, although in fact such passageway may comprise several interconnected passageways, as just described. Also for purposes of simplicity, the various elements of the actuator assembly have been separated in the drawings, although it will be realized that they are closer together than shown in Figures 11 through 14, and are parts of a unitary structure rather than separate elements as shown.

Operation

In the condition shown in Figure 11, the entire system is filled with fluid under substantially atmospheric pressure, and thus the bungee 65 is in its position of minimum stress with the spring 67 completely expanded. Also by reason of the bypass valve spring 147, the valve spool 142 is held in its lowermost position in Figure 11, thus to prevent any escape of fluid through the return fluid connection 98 or the pressure connection 97, and interconnecting passageways 154 and 106 so as to permit free circulation of fluid from and to the main valve spool 120, as will hereinafter be described.

The condition in Figure 11 is that in which no fluid is being delivered through the inlet or pressure connection 97. Upon the application of fluid pressure, the condition in Figure 12 obtains. The bungee 65 is charged, and the spring 67 compressed, whereby to effect a predetermined static pressure on the entire system, even in the event the fluid delivery pressure should fail.

Pressure applied at the inlet connection 97 effects an upward force on the bypass valve spool 142, compressing the spring 147, and moving the valve flange 158 upwardly so as to communicate the inlet connection 97 with the passageway 106 whereby to deliver fluid under pressure to the chamber adjacent the center of the valve spool 120. The aforesaid upward motion of the bypass valve spool 142 also serves to intercommunicate the passageway 109—154 with the return fluid connection 98 whereby to permit fluid to escape from the upper end of the main valve chamber.

After application of pressure as just described, the operation of the actuator will depend on the position of the valve spool 120. In Figure 12, the spool 120 is shown in its intermediate or central position whereby fluid is delivered from the central passageway 106 past the flanges 123 and 124 through the passageways 93 and 94 (note the disposition of the check valves 164) to both the cylinder chambers 47 and 48 whereby the forces exerted on the piston 45 are equalized and no motion of the thrust rod 25 results.

It should be noted that when the system is in the condition illustrated in Figure 12, a sudden reactive force on the thrust rod 25 such as would be occasioned by the buffeting of the control surface connected thereto, will not result in any thrust being transmitted through the system to the valve spool 120 and thence to the pilot's manual control element. The foregoing is for the reason that pressure on the thrust rod 25 will tend to force fluid backwardly through either the passageway 60 or the passageway 61. It will be noted that each of the passageways 60 and 61 connects with a pair of parallel branch passageways (e. g., passageway 60 connects with branch passageways 92 and 93), and that one of said branch passageways is controlled by a check valve 164 and the other by a flange 122 or 125 of the spool 120. By reason of the disposition of the check valves 164, such rearwardly moving fluid cannot pass through either the passageway 93 or the passageway 94. Neither can it escape through either of the passageways 92 or 95, since these are both closed off by the flanges 125 and 122, respectively.

Assuming now that the pilot wishes to exert outward thrust on the thrust rod 25, he applies appropriate manual thrust to the spool 120 (through the control fork 23 and the rod 27), thus moving the valve spool 120 upwardly as shown in Figure 13. When in this position, fluid is delivered from the pressure connection 97 through the passageway 106, the passageway 93, past the check valve 164, and through the passageway 60, into the cylinder chamber 47, thus urging the piston 45 upwardly. In similar fashion, fluid is allowed to escape from the cylinder chamber 48 through the passageway 61, the passageway 95, past the flange 122 which is now moved upwardly out of the way, through the passageways 103 and 154, past the bypass flange 159, and out the return fluid connection 98.

It will be obvious that tension applied to the rod 27 to move the valve spool 120 to its lowermost position in Figures 11 through 14 will result in operation exactly the reverse of that just described in connection with Figure 13.

The result of a pressure failure is illustrated in Figure 14. Here it will be noted that the removal of pressure from the lower end of the bypass valve spool 142 has permitted the spring 147 to force the same downwardly against its lowermost stop, closing off both the pressure connection and the return connection 97 and 98, respectively, and intercommunicating the passageways 106 and 154. Thus while no fluid pressure is available to assist the pilot in moving the thrust rod 25 in one direction or the other, the latter will be protected or locked by the operation of the check valves 164 against rearward movement such, for example, as that caused by the aforesaid buffeting of the control surface. For example, when the pilot applies thrust to the spool 120 in the manner previously described, the same is moved upwardly, thus placing the system in a condition to allow fluid to escape from the cylinder chamber 48 in the manner previously described, which fluid will circulate through the passageway 154 adjacent the bypass valve and away therefrom through the passageway 106 to return through the passageway 93 to the opposite cylinder chamber 47. Should an excessive reactive force be exerted on the thrust rod 25, however, the previously described operation of the check valves 164 will prevent backward or rearward movement of the rod 25, even though the pilot may be exerting only enough force to hold the valve spool 120 in its upper position, as shown in Figure 14.

As another example, suppose that the pressure having failed, the pilot desired to move the control surface to a certain position and then hold it there against buffeting forces in either direction. He would then move the spool 120 to one or the other of its limiting positions and force the control surface to the desired position, thereafter relaxing his pressure to return the spool 120 to a neutral position such as that shown in Figure 12. As previously described, when the spool 120 is in this position, the flanges 122 and 125 close off the passageways 92 and 95, thus trapping the fluid behind the check valves 164, and preventing movement of the piston 45 in either direction.

The foregoing mode of operation is particularly useful in such craft as helicopters wherein the reactive forces exerted by a control surface may often be cyclic, that is, varying between a force which the pilot can overcome and a force greater than that which the pilot conveniently can exert. Under such conditions, it will still be possible for the pilot to move the control surface into a desired position by continuing to exert as much pressure as possible on the movable control element whereupon each time the reactive force drops below that exerted by the pilot, the surface will move a small amount in the direction desired, but when the reactive forces momentarily exceed those exerted by the pilot, no countermovement will take place because of the aforesaid locking action effected by the check valves 164.

In some instances, it is desirable to incorporate a small amount of "feel" into the system, that is, to permit the reactive forces exerted by the control surfaces to be felt, in some degree, by the pilot. When such mode of operation is desired, the check valves 164 are modified by drilling through the same to form a relatively small orifice, such as indicated by the reference character 175 in Figure 9. Thus, instead of completely locking the piston 45 against movement, a small amount of fluid is allowed to leak out of one or the other of the cylinder chambers 47 and 48 through the appropriate check valve 164, so that the thrust rod 25 continuously moves against a steady reactive force on the control surface. Such movement is then transmitted through the connecting rod 22, the valve body 31, and the rod 27, back to the pilot.

It will be realized that, when modified as just described, the system also operates to damp out vibrational or buffeting reactive forces which act in first one direction and then the other, since only a relatively slow reactive movement in one direction is permitted by the flow of fluid through the relatively small orifice 175.

With even reasonable care in sealing off the system, it is possible to incorporate the same in a control assembly purely as an irreversible link, that is, with no pressurized fluid system connected. Furthermore, the irreversible feature disclosed herein can be used to considerable advantage in systems where substantially all of the force necessary to move the control surface is supplied by the pilot. In systems of the latter type, only a nominal amount of fluid pressure need be provided at the pressure inlet 97 for the purpose of restoring such fluid as may leak from the system from time to time.

It will be seen that, due to the relatively short passageways between the control valve and the actuating cylinder, and due to the fact that such passageways are formed in rigid bodies, the responsive movement of the piston 45 as a result of control movement of the valve spool 120 will be extremely accurate since no fluid will be consumed in expanding fluid lines or compressing air bubbles such as may be trapped in such lines. Furthermore, any air which may be trapped in the system will be compressed by the action of the bungee 65 so that its effect will be kept to a minimum.

While the constructions shown and described herein are fully capable of achieving the objects and providing the advantages hereinbefore stated, it will be realized that such constructions are capable of considerable modification without departure from the spirit of the invention. For this reason, we do not mean to be limited to the forms shown and described, but rather to the scope of the appended claims.

We claim:

1. An irreversible lock for a movable, force-transmitting member comprising: two immovable fluid chambers; movable wall means in said chambers to expand or contract the same; means connecting said wall means to said force-transmitting member for concurrent movement therewith such that one of said chambers is expanded when the other is contracted; a fluid passageway intercommunicating said chambers whereby to permit fluid to flow from one chamber to the other when said force-transmitting member is moved; and valve means interposed in said passageway, said valve means including at least one pair of parallel, branch passageways in one of which is a check valve formed with a restricted orifice therethrough to permit relatively highly resisted counterflow of fluid therethrough, said check valve being disposed to restrict fluid flow in a given direction, and a movable valving member disposed in the other of said branch passageways and mechanically connected to said force-transmitting member to close said second branch passageway when said member is moved in a direction to effect fluid flow in a direction opposite to said given direction.

2. Irreversible force-transmitting linkage comprising: a first movable member adapted for connection to an object to be moved; a second movable member adapted for connection to a source of actuating force and coupled by a lost motion connection to said first member whereby forces in either of two selected directions may be transmitted from said source to said object through said members; a fluid-tight enclosure; a movable wall connected to said first member and disposed in said enclosure to hermetically divide the same into two chambers of mutually dependent volume; a passageway connected between said chambers to permit chamber volume compensating fluid flow therebetween when said wall is moved; a valve body carried by one of said members and having a control passageway formed therein and interposed in said first passageway, said control passageway having oppositely oriented check valves therein, and said body having a pair of bypasses formed therein, one around each of said check valves; and a valving member carried by the other of said first two members movable in said body between alternate positions to block one or the other of said bypasses.

3. The construction of claim 2 further characterized in that said check valves are each formed with restricted orifices therethrough to permit relatively highly resisted counterflow of fluid therethrough.

4. Irreversible power actuating linkage comprising in combination: a double acting hydraulic cylinder; a piston in said cylinder; a rod extending through said cylinder secured intermediate its ends to said piston and adapted by terminal attachment means for inclusion in a bidirectional force-transmitting system; conduit means including axially extending passageways in said rod, and a pair of fluid ports in said rod to deliver fluid into portions of said cylinder on opposite sides of said piston; a four-way valve connected to said conduit means and adapted for connection to a source of fluid under pressure and a fluid return whereby said valve is operable to move said piston selectively in one direction or the other in said cylinder; a mechanical connection between said terminal attachment means and said valve, responsive to the direction of force transmitted through said rod to operate said valve concurrently with each change in direction of force transmitted by said rod; and hydraulic accumulator means in said rod including a spring-urged movable pressure wall and a separate axially extending passageway in said rod communicating said accumulator with said valve at a point therein adjacent the connection to said source.

5. Irreversible power actuating linkage comprising in combination: a double acting hydraulic cylinder; a piston in said cylinder; a rod extending through said cylinder secured intermediate its ends to said piston and adapted by terminal attachment means for inclusion in a bidirectional force-transmitting system; means including axially extending passageways in said rod, and a pair of fluid ports in said rod to deliver fluid into portions of said cylinder on opposite sides of said piston; a four-way valve connected to said last-named means and having an inlet adapted for connection to a source of fluid under pressure and an outlet adapted for connection to a fluid return whereby said valve is operable to move said piston selectively in one direction or the other in said cylinder; and a fluid pressure actuated bypass valve normally interposed between said inlet and outlet and held in said normal position by said source pressure, said bypass valve being adapted to move to block said inlet and outlet from said pressure source and return, respectively, and to intercommunicate said inlet and outlet upon the pressure from said source falling below a predetermined minimum value.

6. Irreversible power actuating linkage comprising in combination: a double acting hydraulic cylinder; a piston in said cylinder; a rod extending through said cylinder secured intermediate its ends to said piston and adapted by terminal attachment means for inclusion in a bidirectional force-transmitting system; conduit means including axially extending passageways in said rod, and a pair of fluid ports in said rod to deliver fluid into portions of said cylinder on opposite sides of said piston; a four-way valve connected to said conduit means having an inlet adapted for connection to a source of fluid under pressure and an outlet adapted for connection to a fluid return whereby to move said piston selectively in one direction or the other in said cylinder; hydraulic accumulator means in said rod including a spring-urged movable pressure wall and a separate axial passageway in said rod communicating said accumulator with said valve inlet; and a fluid pressure actuated bypass valve normally interposed between said inlet and outlet and held in said normal position by said source pressure, said bypass valve being adapted to move to block said inlet and outlet from said pressure source and return, respectively, and to intercommunicate said inlet and outlet upon the pressure from said source falling below a predetermined minimum value.

7. A fluid pressure power actuator comprising in combination: a double acting fluid motor having an extending force-transmitting member adapted for connection to an object to be moved; a follow-up member connected to said motor for concurrent movement with said force-transmitting member; a control member coupled by a lost motion connection to said follow-up member whereby force may be applied through said follow-up member to said force-transmitting member in addition to that applied by said motor; a control valve body having an inlet adapted for connection to a source of fluid under pressure, an outlet adapted for connection to a fluid return, and supported on said follow-up member adjacent said lost-motion connection; a pair of passageways in said follow-up member to carry operating fluid from said valve to said motor and back to said valve; a valving member supported in said body for movement between alternate positions in which said motor is actuated in alternate directions, said valving member being secured to said control member whereby to be operated to actuate said motor in coordination with the forces applied thereto by said control member; and means to lock said motor against movement in a direction opposite to that urged by said control member, said locking means including a pair of branch passageways formed in said body and connected at their juncture to one of said first passageways; the separate ends of said branch passageways being adjacent to, and under the control of said valving member and spaced so that one is open when the other is closed, and one of said branch passageways having a check valve therein.

8. A fluid pressure power actuator comprising in combination: an enclosed cylinder having formed thereon trunnions whereby to support the same against axial movement; a piston in said cylinder; a force-transmitting piston rod secured to said piston and extending through and beyond an outer end of said cylinder; a follow-up piston rod secured to said piston and extending through and beyond an inner end of said cylinder for concurrent movement with said piston and force-transmitting rod; a control member coupled by a lost motion connection to said follow-up rod whereby force may be applied to said force-transmitting rod in addition to that applied by fluid pressure in said cylinder acting on said piston; a control valve body having an inlet adapted for connection to a source of fluid under pressure, an outlet adapted for connection to a fluid return, and supported on said follow-up rod adjacent said lost motion connection; a pair of axially extending passageways in said follow-up rod to carry operating fluid from said valve to said cylinder; a pair of axially extending passageways in said follow-up rod, each connected by a port through said rod to a point in said cylinder on one or the other side of said piston whereby to carry operating fluid from said valve to said cylinder and back to said valve; a valving member supported in said body for movement between alternate positions in which said piston is actuated in alternate directions in said cylinder, said valving member being mechanically connected to said control member whereby to be operated to actuate said piston in coordination with forces applied thereto by said member; and means to lock said piston against movement in a direction opposite to that urged by said control member, said locking means including a pair of branch passageways formed in said body connected at their juncture to one of said axially extending passageways; the separate ends of said branch passageways being adjacent to, and under the control of said valving member and so spaced that one is always open when the other is closed, one of said branch passageways having a check valve therein.

9. The construction of claim 8 further characterized by having a second pair of branch passageways formed in said body and connected at their juncture to the other of said axially extending passageways; the separate ends of said second pair of branch passageways being adjacent to, and under the control of said valving member and so spaced that one is always open when the other is closed, and one of said second pair of branch passageways having a second check valve therein, said pairs being so spaced that the check valve branch of either of said pairs is always open when the check valve branch of the other pair is closed, and further arranged so that non-check valved branches are both closed whenever both of said check valve branches are open.

10. The construction of claim 9 further characterized by having a fluid pressure actuated bypass valve disposed in said body and connected between said inlet and outlet, said bypass valve being responsive to pressure in said inlet whereby to block said inlet and outlet from said pressure source and return, respectively, and to intercommunicate said inlet and outlet upon the pressure at said inlet falling below a predetermined minimum value.

11. A fluid pressure power actuator comprising: a double acting fluid motor having two actuating chambers of mutually complemental volume; a control valve for said motor having an inlet port, a discharge port, a pair of actuating ports, one communicated with each of said chambers, and a valving member operatively associated with all of said ports and movable between two positions in either of which an alternate one of said chambers is communicated with said inlet port and at the same time the other chamber is communicated with said discharge port; a pressure passageway to deliver fluid from an external source to said control valve; a return passageway to return fluid from said control valve to said source; and a fluid pressure actuated bypass valve interposed in said passageways and exposed to, and held by pressure at said pressure passageway in a first position in which said inlet and discharge ports are blocked from each other and communicated respectively with said pressure and return passageways, said bypass valve being adapted upon a drop of pressure at said inlet passageway below a predetermined value, to move to a second position in which said passageways are blocked and said inlet and discharge ports are intercommunicated.

12. A fluid pressure power actuator comprising: a double acting fluid motor having two actuating chambers of mutually complemental volume; a control valve for said motor having an inlet port, a discharge port, a pair of actuating ports, each communicated with one of said chambers, and each having a check valve therein oriented to prevent escape of fluid from said chamber through said actuating port; a pair of fluid release ports, one communicated with each of said chambers, and a valving member operatively associated with said ports and movable between two positions in either of which the actuating port to an alternate one of said chambers is communicated with said inlet port, the release port from said chamber is blocked, and at the same time the actuating port to the other chamber is blocked and the release port therefrom communicated with said discharge port; a pressure passageway to deliver fluid from an external source to said control valve; a return passageway to return fluid from said control valve to said source; and a fluid pressure actuated bypass valve interposed in said passageway and exposed to, and held by pressure at said pressure passageway in a first position in which said inlet and discharge ports are blocked from each other and communicated respectively with said pressure and return passageways, said bypass valve being adapted upon a drop of pressure at said inlet passageway below a predetermined value, to move to a second position in which said passageways are blocked and said inlet and discharge ports are intercommunicated.

13. A fluid pressure power actuator comprising in combination: a double acting fluid motor having an extending force-transmitting member adapted for connection to an object to be moved; a control member coupled by a lost-motion connection to said force-transmitting member whereby force may be applied through the latter to said object in addition to that applied by said motor; a control valve having a body with an inlet to receive fluid from a pressure source, an outlet to discharge fluid for return to said source, a pair of passageways connected to conduct fluid to said motor and back to said valve, and a valving member supported in said body for movement therein between alternate positions in which said motor is actuated in alternate directions, one member of said body and valving member being supported on said force-transmitting member and the other on said control member whereby to actuate said motor in coordination with forces applied by said control member; and means to lock said motor against movement in a direction opposite to that urged by said control member, said locking means including a pair of branch passageways formed in said body and connected at their juncture to one of said first passageways, the separate ends of said passageways being adjacent to and under the control of said valving member and spaced so that one is open when the other is closed, and one of said branch passageways having a check valve therein.

LEE E. BALDWIN.
CYRIL W. FRANKLIN.

REFERENCES CITED

The following references are of record in the file of this patent:

UNITED STATES PATENTS

| Number | Name | Date |
| --- | --- | --- |
| 1,258,337 | Imblum | Mar. 5, 1918 |
| 1,605,250 | McKenzie | Nov. 2, 1926 |
| 2,012,861 | Woolson | Aug. 27, 1935 |
| 2,179,179 | Fischel et al. | Nov. 7, 1939 |
| 2,293,555 | Mercier | Aug. 18, 1942 |
| 2,372,710 | Chisholm, Jr. | Apr. 3, 1945 |
| 2,474,630 | Jamison | June 28, 1949 |
| 2,482,249 | Court | Sept. 20, 1949 |
| 2,563,295 | Westbury | Aug. 7, 1951 |
| 2,566,273 | Westbury | Aug. 28, 1951 |

FOREIGN PATENTS

| Number | Country | Date |
| --- | --- | --- |
| 487,909 | Great Britain | June 28, 1938 |